United States Patent [19]
Sutton

[11] 3,821,397
[45] June 28, 1974

[54] 4-CYCLOHEXYLVULPINIC ACID DERIVATIVES IN THE TREATMENT OF ARTHRITIS

[75] Inventor: Blaine M. Sutton, Hatboro, Pa.

[73] Assignee: Smithkline Corporation, Philadelphia, Pa.

[22] Filed: May 7, 1973

[21] Appl. No.: 357,762

Related U.S. Application Data

[60] Division of Ser. No. 282,534, Aug. 21, 1972, which is a continuation-in-part of Ser. No. 188,439, Oct. 13, 1971, abandoned.

[52] U.S. Cl. ............................................... 424/279
[51] Int. Cl. .......................................... A61k 27/00
[58] Field of Search ................... 424/282, 280, 279

Primary Examiner—Stanley J. Friedman
Attorney, Agent, or Firm—Joseph A. Marlino; Richard D. Foggio; William H. Edgerton

[57] ABSTRACT

4-Cyclohexylvulpinic acid derivatives having antiarthritic activity prepared by alcoholysis of the corresponding 4-cyclohexylpulvinic acid dilactone.

2 Claims, No Drawings

4-CYCLOHEXYLVULPINIC ACID DERIVATIVES IN THE TREATMENT OF ARTHRITIS

This is a division of application Ser. No. 282,534 filed Aug. 21, 1972, which is a continuation-in-part of Ser. No. 188,439, filed Oct. 13, 1971, now abandoned.

This invention relates to novel 4-cyclohexylvulpinic acid derivatives having valuable pharmacodynamic activity. More specifically, these compounds possess anti-arthritic activity and at anti-arthritic doses they further produce analgesic and antipyretic activity.

The compounds of this invention are represented by the following general structural formulas:

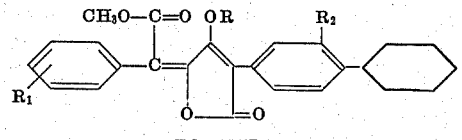

FORMULA I and

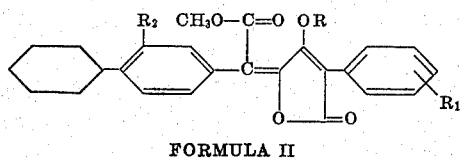

FORMULA II wherein:

R represents hydrogen, acrylyl, methacrylyl, dimethylacrylyl, crotonyl or cinnamoyl;

$R_1$ represents hydrogen, chlorine, bromine, fluorine, lower alkyl of from 1 to 4 carbon atoms, lower alkoxy of from 1 to 4 carbon atoms, dimethoxy, trimethoxy, or trifluoromethyl; and $R_2$ represents hydrogen, chlorine, bromine, or fluorine.

Preferably the compositions of this invention comprise a compound of the above formulas when R is hydrogen, $R_1$ is hydrogen, chlorine, fluorine, methyl, methoxy, or ethoxy, and $R_2$ is hydrogen or chlorine. Most advantageously, R is hydrogen and $R_1$ is hydrogen or ethoxy, and $R_2$ is chlorine.

The novel 4-cyclohexylvulpinic acid derivatives are prepared according to the following synthetic procedure:

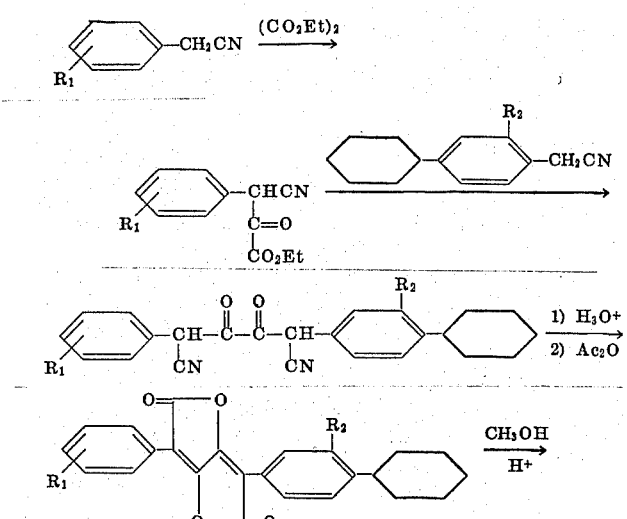

FORMULA III

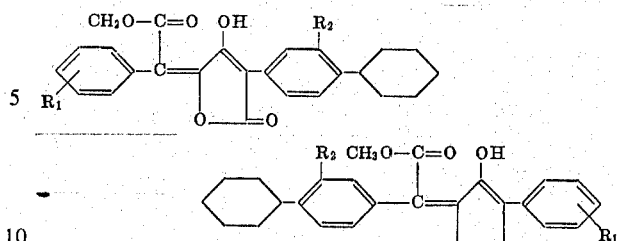

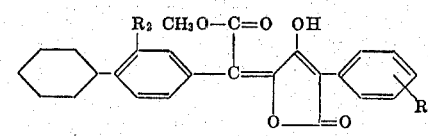

and

| Acyl Halide Pyridine | Separated by Fractional Crystallization from $C_6H_6$ and $CH_3OH$ |

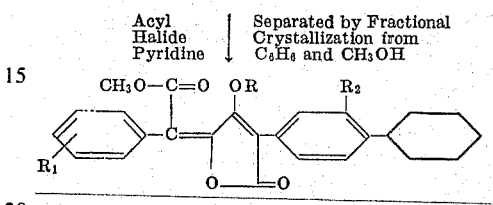

in which R, $R_1$ and $R_2$ are as defined for the above formulas. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a 4-cyclohexylphenylacetonitrile in an alcoholic solution of an alkali metal lower alkoxide, such as sodium methoxide or ethoxide to yield the 2-(4-cyclohexylphenyl)-5-phenyl-3,4-dioxoadiponitrile. The above condensations may also be carried out using a metal hydride, such as sodium hydride, in diglyme. The adiponitrile derivative is refluxed for a short period of time, for example 1 or 2 hours, in an aqueous acid solution such as water/glacial acetic acid/concentrated sulfuric acid mixture and the resulting pulvinic acid is refluxed with acetic anhydride to furnish the corresponding pulvinic acid lactone of Formula III above. The dilactone is ring opened to the 4-cyclohexylvulpinic acid by brief refluxing with methanol containing a mineral acid such as hydrochloric acid. The vulpinic acid derivative is then heated with the appropriate acyl halide, preferably acyl chloride. The reaction is advantageously carried out in a nonreactive organic solvent such as chloroform in the presence of pyridine to yield the desired ester of 4-cyclohexylvulpinic acid.

In the above synthetic sequence, the ring opening of the dilactone of Formula III gives a mixture of positional isomers, namely compounds of Formula I and compounds of the following formula:

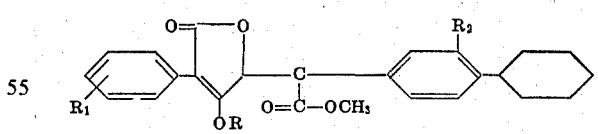

The ratio of isomers obtained is variable. The isomers can be separated by fractional crystallization and/or chromatographic procedures. Their identity is determined from the nuclear magnetic resonance patterns of the aromatic protons. This identification can be confirmed by degradative ozonolysis.

The anti-arthritic activity of the compounds of this invention is measured by their ability to inhibit adjuvant arthritis in rats. The novel compounds of this invention produce marked inhibition of the development of adjuvant arthritis in rats at a daily oral dose of 16 mg. per kilogram of body weight. Adjuvant arthritis in rats is produced by a single injection of 0.75 mg. of Mycobacterium butyricum suspended in white paraffin (N.F.) into a hindpaw (left footpad). The injected paw becomes inflamed and reaches a maximum volume in 3–5 days (primary lesion). The animals exhibit a decrease in body weight gain during this initial period. Adjuvant arthritis (seconary phase) occurs after a delay of approximately 10 days and is characterized by inflammation of the non-injected sites (right hind leg), decrease in body weight gain and further increases in the volume of the injected hind leg. The compounds of Formulas I and II administered in the doses described above beginning on the day of adjuvant injection and continuing for 17 days thereafter, exclusive of days 4, 5, 11, and 12, protect the animals against development of both primary and secondary lesions of adjuvant arthritis.

The compounds of this invention may be administered orally or parenterally in conventional dosage unit forms such as tablets, capsules, injectables or the like, by incorporating the appropriate dose of a compound of Formulas I and II with carriers according to accepted pharmaceutical practices. Preferably the compound is administered orally to an animal organism in a tablet or capsule comprising an amount sufficient to produce anti-arthritic activity. Each dosage unit will contain the active medicament in an amount of about 10 mg. to about 50 mg. Advantageously equal doses will be administered 1 to 3 times daily with the daily dosage regimen being about 10 mg. to about 150 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of phrarmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples are not limiting but are illustrative of compounds of this invention and the procedures for their preparation. Other variations of this invention will be obvious to those skilled in the art.

EXAMPLE 1

A mixture of 117.1 g. of phenylacetonitrile and 326 ml. of ethyl oxalate is added to an ethanol solution of sodium ethoxide (prepared by dissolving 23.8 g. in 500 ml. of absolute ethanol) and refluxed two hours. After cooling, diluting with 2,500 ml. of water and extracting with ether, the solution is acidified with acetic acid. The solid is removed and washed with water to give ethyl 3-cyano-3-phenylpyruvate, m.p., 127°–129° C.

Ethyl 3-cyano-3-phenylpyruvate (6.95 g.) is slowly added to a mixture of 7.45 g. of 3-chloro-4-cyclohexylphenylacetonitrile and 9.54 g. of sodium hydride in 20 ml. of diglyme at a temperature of −5° to 0° C. The mixture is stirred at room temperature overnight, diluted with 150 ml. of water and extracted with ether. The aqueous layer is acidified with acetic acid to yield 2-(3'-chloro-4'-cyclohexylphenyl)-5-phenyl-3,4-dioxoadiponitrile as an orange solid, m.p. 218° C. (d).

A mixture of 10.3 g. of 2-(3'-chloro-4'-cyclohexylphenyl)-5-phenyl-3,4-dioxoadiponitrile in 75 ml. of water, 100 ml. of glacial acetic acid and 50 ml. of concentrated sulfuric acid is refluxed for one hour. The suspension is cooled, poured onto 900 ml. of ice water and the solid removed and washed to give 3'-chloro-4'-cyclohexylpulvinic acid, m.p. 212°–217° C.

3'-Chloro-4'-cyclohexylpulvinic acid (7.6 g.) is refluxed in 130 ml. of acetic anhydride for 15 minutes. The cooled solution is stirred into 500 ml. of ice and water and the oily mass crystallized by stirring in 250 ml. of ethanol. The yellow solid is removed, washed with ethanol and dried to yield 3'-chloro-4'-cyclohexylpulvinic acid lactone, m.p. 178°–179° C.

A mixture of 5.0 g. of the pulvinic acid lactone, in 600 ml. of methanol containing 10 ml. of hydrochloric acid (36 percent) is refluxed 1 hour forming a yellow solution. The reaction mixture is concentrated to 150 ml. under reduced pressure, cooled and the crystallized solid, 3'-chloro-4'-cyclohexylvulpinic acid, is washed and dried, m.p. 185°–187° C.

Work up of the methanol filtrate and crystallization from benzene and methanol yielded 3-chloro-4-cyclohexylvulpinic acid.

EXAMPLE 2

Acrylyl chloride, 5 ml., is added to a solution of 4.38 g. of 3'-chloro-4'-cyclohexylvulpinic acid (as prepared in Example 1) in 25 ml. of chloroform containing 1 ml. of pyridine and refluxed for five minutes. The reaction mixture is then concentrated, washed and recrystalized to yield acrylyl 3'-chloro-4'-cyclohexylvulpinic acid.

EXAMPLE 3

By employing the procedure set forth in Example 1, the following starting materials are substituted for phenylacetonitrile:
a. p-chlorophenylacetonitrile
b. m-methoxyphenylacetonitrile
c. o-fluorophenylacetonitrile
d. 3,4,5-trimethoxyphenylacetonitrile
e. m-trifluoromethylphenylacetonitrile
followed by reaction with 3-chloro-4-cyclohexylphenylacetonitrile and the subsequent synthetic steps there is prepared respectively:
a 4-chloro-3'-chloro-4'-cyclohexylvulpinic acid
b 3-methoxy-3'-chloro-4'-cyclohexylvulpinic acid
c 2-fluoro-3'-chloro-4'-cyclohexylvulpinic acid
d 3,4,5-trimethoxy-3'-chloro-4'-cyclohexylvulpinic acid
e 3-trifluoromethyl-3'-chloro-4'-cyclohexylvulpinic acid.

EXAMPLE 4

Methacrylyl chloride, 5 ml., is added to a solution of 4.75 g. of 4-chloro-3'-chloro-4'-cyclohexylvulpinic acid (as prepared in Example 3) in 30 ml. of chloroform containing 1 ml. of pyridine and refluxed for 5 minutes. The reaction mixture is then concentrated, washed and recrystallized to yield methacrylyl 4-chloro-3'-chloro-4'-cyclohexylvulpinic acid.

EXAMPLE 5

Following the procedures outlined in Example 1, 4-cyclohexylphenylacetonitrile is reacted with ethyl 3-cyano-3-phenylpyruvate and the subsequent synthetic steps yield a mixture of 4'-cyclohexylvulpinic acid and 4-cyclohexylvulpinic acid. The isomers are then crystallized from methanol and benzene to first yield 4'-cyclohexylvulpinic acid. Evaporation of the solvent and further crystallization from methanolbenzene yields the 4-cyclohexylvulpinic acid.

EXAMPLE 6

| Ingredients | Mg./Tablet |
| --- | --- |
| 3'-Chloro-4'-cyclohexylvulpinic Acid | 10 |
| Calcium Sulfate, dihydrate | 150 |
| Sucrose | 25 |
| Starch | 15 |
| Talc | 5 |
| Stearic Acid | 3 |

The sucrose, calcium sulfate and vulpinic acid are thoroughly mixed and granulated with hot 10 percent gelatin solution. The wetted mass is passed through a 6 mesh screen directly onto drying trays. The granules are dried at 120° C. and passed through a 20 mesh screen, mixed with the starch, talc and stearic acid, and compressed into tablets.

EXAMPLE 7

| Ingredients | Mg.Capsule |
| --- | --- |
| 3'-Fluoro-4'-cyclohexylvulpinic Acid | 50 |
| Magnesium Stearate | 5 |
| Lactose | 350 |

The above ingredients are screened through a 40 mesh screen, mixed and filled into 0 hard gelatin capsules.

EXAMPLE 8

By following the procedures outlined in Example 1 and employing p-ethoxyphenylacetonitrile in the initial reaction to obtain ethyl-3-cyano-3-(p-ethoxyphenyl)-pyruvate followed by reaction with 4-cyclohexylphenylacetonitrile and the subsequent synthetic steps, there is prepared 4-ethoxy-4'-cyclohexylvulpinic acid.

What is claimed is:

1. A pharmaceutical composition having anti-arthritic activity in dosage unit form comprising a pharmaceutical carrier and from about 10 mg. to about 50 mg. of a chemical compound selected from the formulas:

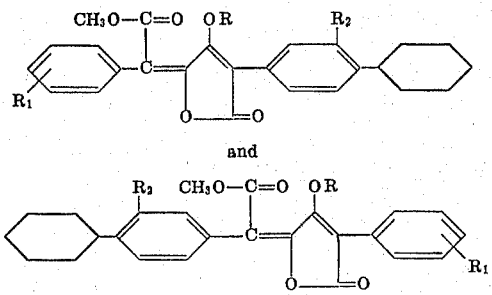

wherein:
R is hydrogen, acrylyl, methacrylyl, dimethylacrylyl, crotonyl or cinnamoyl;
$R_1$ is hydrogen, chlorine, bromine, fluorine, lower alkyl of from 1 to 4 carbon atoms, lower alkoxy of from 1 to 4 carbon atoms, dimethoxy, trimethoxy, or trifluoromethyl; and
$R_2$ is hydrogen, chlorine, bromine or fluorine.

2. A method of producing anti-arthritic activity which comprises administering internally to animals in need of arthritic relief an amount sufficient to produce said activity a chemical compound selected from the formulas:

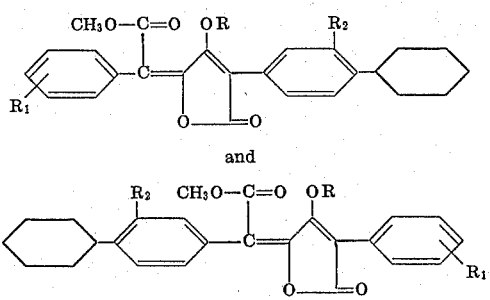

wherein:
R is hydrogen, acrylyl, methacrylyl, dimethylacrylyl, crotonyl or cinnamoyl;
$R_1$ is hydrogen, chlorine, bromine, fluorine, lower alkyl of from 1 to 4 carbon atoms, lower alkoxy of from 1 to 4 carbon atoms, dimethoxy, trimethoxy, or trifluoromethyl; and
$R_2$ is hydrogen, chlorine, bromine, or fluorine.

* * * * *